United States Patent [19]

Wheeler et al.

[11] Patent Number: 5,124,873
[45] Date of Patent: Jun. 23, 1992

[54] SURGE SUPPRESSION CIRCUIT FOR HIGH FREQUENCY COMMUNICATION NETWORKS

[75] Inventors: John M. Wheeler; Michael F. Stringfellow, both of Salt Lake City, Utah

[73] Assignee: EFI Corporation, Salt Lake City, Utah

[21] Appl. No.: 428,975

[22] Filed: Oct. 30, 1989

[51] Int. Cl.⁵ .............................................. H02H 9/04
[52] U.S. Cl. ........................................ 361/58; 361/56; 361/111; 361/113
[58] Field of Search .................. 361/56, 58, 111, 91, 361/113, 119, 126, 127

[56] References Cited

U.S. PATENT DOCUMENTS

| | | | |
|---|---|---|---|
| 4,389,695 | 6/1983 | Carpenter, Jr. | 361/91 X |
| 4,586,104 | 4/1986 | Standler | 361/56 X |
| 4,677,518 | 6/1987 | Hershfield | 361/56 |

Primary Examiner—Todd E. Deboer
Attorney, Agent, or Firm—Thorpe, North & Western

[57] ABSTRACT

A surge suppression circuit for use in a high frequency communication network, having a primary line and a ground line, includes a gas tube connected between the primary line and ground line, a bi-directional avalanche diode and one or more ferrite beads connected in series between the primary line and ground line, and a metal oxide varistor connected in series in the primary line.

17 Claims, 1 Drawing Sheet

SURGE SUPPRESSION CIRCUIT FOR HIGH FREQUENCY COMMUNICATION NETWORKS

BACKGROUND OF THE INVENTION

The present invention relates to a system and method for suppressing electrical surges and transients on high frequency communication networks typified by CATV communication systems.

Electrical transients, such as those caused by electromagnetic interference (fluorescent lights, transformers, automobile ignitions, etc.), operation of electrical switches, short circuits, electrical storms and the like, cause disruption, false operation and even damage to electrical and electronic equipment connected to electrical power networks, and to communication systems and equipment. A variety of devices and circuits have been developed for suppressing electrical transients and surges and thus protecting electrical power systems and information transmission systems. Some of these devices include gas tubes (an electron tube containing a small amount of gas or vapor which ionizes when a certain voltage is developed across the tube, with such ionization allowing a greatly increased current flow to discharge the increasing voltage), metal oxide varistors (a two-electrode semiconductor device in which a metal oxide is placed between the electrodes so that as voltage across the metal oxide increases to a certain level, the metal oxide breaks down or becomes conductive and current is conducted through the metal oxide to "clamp" the voltage to said certain level), and avalanche diodes (a silicon diode that acts like a rectifier until applied voltage reaches a certain value, known as the avalanche reverse-breakdown voltage—typically more than eight volts, at which point the diode becomes conducting with the voltage drop across the diode remaining essentially constant independent of the current). Combinations of these devices have also been utilized, along with other electrical components, to form hybrid circuits for suppressing electrical transients.

Special problems arise in attempting to suppress electrical transients and surges in high frequency or radio frequency communication lines since most times the suppression of the transient also results in attenuation of the high frequency signals being transmitted over the lines. Such signal attenuation in, for example, a cable television (CATV) communication system, results in a deterioration of picture quality.

Conventional approaches at surge suppression in high frequency communication lines have generally involved the use of a single component, usually a gas tube, or a three-stage hybrid circuit such as shown in FIG. 1A. The FIG. 1 prior art circuit consists of a gas tube, a resistor or inductor and an avalanche diode or diodes. This circuit, although providing good "clamping" at a high surge current rating, also acts as a low-pass filter (the combination of the capacitance of the avalanche diode and the resistor [or inductor]) which attenuates high frequency signals. As a consequence, the circuit of FIG. 1A is suitable as a surge suppressor only for communication lines whose signal frequencies range up to about 10 MHz.

FIGS. 1B and 1C show other prior art circuits devised to improve the upper frequency cutoff level, both of which utilize low-capacitance switching diodes for reducing the effective capacitance of avalanche diodes, also utilized in both circuits. The circuits of FIGS. 1B and 1C are generally effective for communication lines whose signal frequencies range up to about 50 MHz.

The problems discussed above in devising a suitable surge suppression circuit for high frequency communication lines have been addressed by at least one commentator who stated that "protection of rf circuits was largely an unsolved problem" and then quoted *Military Handbook* 419 (1982, p. 1-84) to the effect that "effective suppression devices/circuits are not currently available for in-line installation on rf lines above 3 MHz primarily because of high insertion losses". Standler, Ronald B., "*Protection of Electronic Circuits from Overvoltages*", John Wiley and Sons, page 152.

SUMMARY OF THE INVENTION

It is an object of the invention to provide a surge suppression system and method for use on high frequency communication networks.

It is also an object of the invention to provide a surge suppression circuit especially suitable for CATV transmission systems.

It is a further object of the invention to provide a surge suppression circuit capable of protecting against voltage/current surges on a radio frequency communication network with very little attendant attenuation of the radio frequency signals.

It is an additional object of the invention to provide such a surge protection circuit which is simple in design and relatively inexpensive.

The above and other objects of the invention are realized in a specific illustrative embodiment of an electrical transient and surge suppression circuit for use in a high frequency signal communication system represented by a signal or primary line and a neutral or ground line, such as a CATV transmission system. The surge suppression circuit includes a gas tube connected between the signal line and neutral line, an avalanche diode and one or more ferrite bead inductors connected in series between the signal line and neutral line, and an element which exhibits capacitance, such as a metal oxide varistor or avalanche diode, connected in series in the signal line between the connections of the gas tube and the avalanche diode and ferrite bead inductor.

The above-described hybrid surge suppressor circuit effectively suppresses voltages to a level of about 25 volts for a surge of about 1 kA peak current and 8×20 microseconds waveshape. The circuit can withstand surges of about 10 kA peak current for an 8×20 microseconds waveshape. The signal attenuation with this suppressor circuit is not greater than −3 dB for a signal frequency range of from 6 MHz to 550 MHz, and not greater than −1.25 dB for a range of 40 MHz to 400 MHz.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1A:
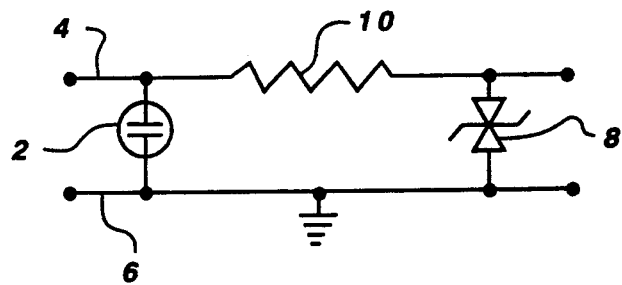
FIGS. 1A, 1B and 1C show a prior art circuits for use in suppressing electrical surges on communication networks.

The prior art surge suppression circuit of FIG. 1A was described earlier to include a gas tube 2 connected between lines 4 and 6 of a transmission system. Also included is a bi-directional avalanche diode 8 also connected between the lines 4 and 6, and a resistor 10 disposed in the line 4 between the connections of the gas tube 2 and the avalanche diode 8. As evident from FIG. 1, the resistor 10 and the capacitance of the avalanche diode 8 form an RC low-pass filter which operates to attenuate high frequency signals carried over the transmission lines 4 and 6. Of course, such a suppression circuit would not be suitable for high frequency (rf) transmission systems.

Figure 1B:
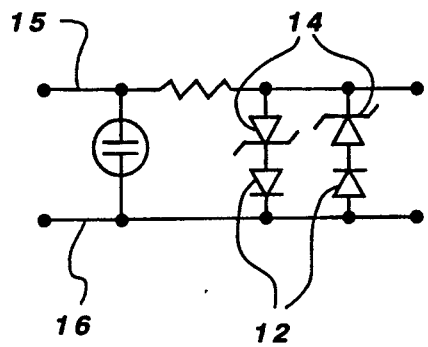
Figure 1C:
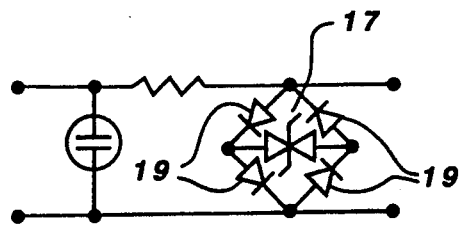

The prior art surge suppression circuits of FIGS. 1B and 1C operate more effectively at higher frequencies than does the circuit of FIG. 1A, but they still fall short in providing desired surge protection without serious signal degradation. The circuit of FIG. 1B includes low-capacitance switching diodes connected in series with respective uni-directional avalanche diodes 14, and across lines 15 and 16 of a transmission system. The FIG. 1C prior art circuit includes a bridge circuit having a bi-directional avalanche diode 17 and four low-capacitance switching diodes 19.

Figure 2:
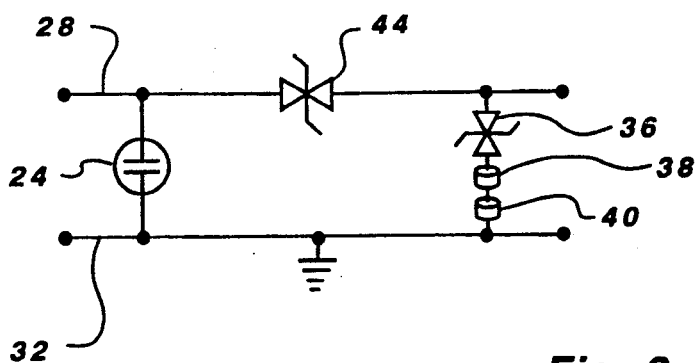
FIG. 2 shows one embodiment of a surge suppression circuit for use in high frequency communication networks and made in accordance with the principles of the present invention.

FIG. 2 shows one embodiment of a hybrid surge suppression circuit for high frequency communication systems. This circuit also includes a gas tube 24 connected between a signal or primary line 28 and a neutral or ground line 32 of a high frequency communication system. Also included is an avalanche diode 36 connected in series with two ferrite bead inductors 38 and 40. This series connection in turn is connected between lines 28 and 32 on the "destination" or receiving side of the communication system. A bi-directional avalanche diode 44 is coupled in line 28 between the connections of the gas tube 24 and the avalanche diode 36.

The gas tube 24 serves as the primary protective element of the hybrid circuit, discharging with high voltage/current surges to protect the other elements of the circuit. The inherent capacitance of the avalanche diode 44 serves to conduct or pass the high frequency signals carried on the signal line 28. The avalanche diode 44 also suppresses the capacitative discharge transient produced when the gas tube 24 fires. That is, the spike which would otherwise result from discharge of the capacitance of the avalanche diode 44 when the gas tube 24 fires is suppressed by the avalanche diode 44.

The avalanche diode 36 provides the final clamping element in the circuit, conducting at a lower predetermined voltage than that of the gas tube 24, to thereby clamp transient voltages to such predetermined level.

Finally, the ferrite bead inductors 38 and 40, when operating at low currents typical of normal signal operation, have the characteristic of inductance at low to medium frequencies (less than 50 MHz) and resistance at very high signal frequencies (50 to 500 MHz). At high currents, typical of operation during surges, the bead inductors 38 and 40 present low impedance due to core saturation. Thus, the bead inductors 38 and 40 prevent the high signal frequencies of normal operation from being shunted through the avalanche diode 36. However, the bead inductors 38 and 40 switch to low impedance at high currents, effectively shunting surges through the avalanche diode 36.

Exemplary components and values of the FIG. 2 circuit are: avalanche diodes 36 and 44—General Semiconductor's diodes no. 1.5KE24C; ferrite bead inductors 38 and 40—0.5 micro H Fair-Rite #64 material (a nickel-zinc composition).

Figure 3:
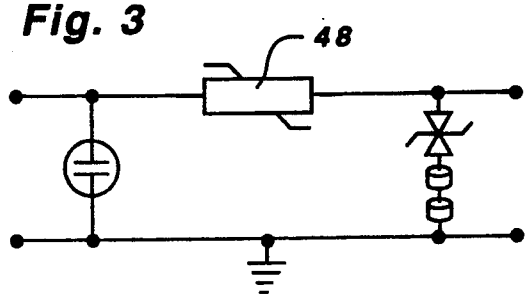
FIG. 3 shows another embodiment of a surge suppression circuit, also made in accordance with the principles of the present invention.

FIG. 3 shows an alternative embodiment of the surge suppression circuit of the present invention in which a metal oxide varistor (MOV) 48 replaces the avalanche diode 44 of the FIG. 2 arrangement. The metal oxide varistor 48 might illustratively be Siemen's no. S14K11 MOV. The metal oxide varistor 48, in combination with the other elements shown in FIG. 3, provide the following performance characteristics:

Signal attenuation: −3 dB for a frequency range of 6 MHz to 550 MHz

−1.25 dB for a frequency range of 40 MHz to 400 MHz

Suppressed voltage: 25 volts at 1 kilo amps, 8×20 us

Maximum Surge Immunity: 10 kilo amps, 8×20 us.

In the manner described, a simple, inexpensive and easy to implement surge suppression circuit is provided for rf communication networks. The circuit allows for suppressing large voltage/current transients and surges with very little attendant signal attenuation.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A surge suppression circuit including
    first and second lines for use in a high frequency communication network,
    a gas tube connected between the first and second lines for conducting transient current therebetween when the transient voltage exceeds a first predetermined level,
    an avalanche diode connected between the first and second lines for conducting transient current therebetween when the transient voltage exceeds a second predetermined level lower than said first level, and
    a metal oxide varistor connected in line with said first line and in series between the connection points of the gas tube and the avalanche diode to the first line.

2. A surge suppression circuit as in claim 1 further including inductance means connected in series with said avalanche diode.

3. A surge suppression circuit as in claim 2 wherein said inductance means comprises one or more ferrite bead inductors.

4. A surge suppression circuit as in claim 2 wherein said inductance means is connected between said avalanche diode and said second line.

5. A surge suppression circuit comprising
    a primary line and a neutral line each having an originating end and destination end for connection in a radio frequency communication means,
    a gas tube coupled between the primary line and neutral line,
    an avalanche diode and inductance means coupled in series between the primary line and neutral line on the destination side of the gas tube, and capacitance means coupled in line with the primary line and in series between the connections to the primary line of the gas discharge tube and the series avalanche diode and inductance means.

6. A surge suppression circuit as in claim 5 wherein said capacitance means comprises an avalanche diode.

7. A surge suppression circuit as in claim 5 wherein said capacitance means comprises a metal oxide varistor.

8. A surge suppression circuit as in claim 5 wherein said inductance means comprises ferrite bead conductors.

9. A circuit for suppressing voltage/current surges including
- a two wire communication line having an originating end and a destination end,
- a gas discharge tube coupleable between said wires,
- an avalanche diode coupleable between said wires at a location between the gas discharge tube and the destination end of the communication line, and
- a metal oxide varistor connectable in line in one of the wires and in series between the connections of the gas discharge tube and avalanche diode to said one wire.

10. A circuit as in claim 9 further including inductance means connectable in series with the avalanche diode between said wires.

11. A circuit as in claim 10 wherein said inductance means comprises ferrite bead inductors.

12. A circuit for suppressing voltage/current surges including
- a signal wire and a neutral wire connecting an originating end and a destination end of a high frequency communication line,
- first means connectable between said wires for clamping surges to a first predetermined voltage level and for conducting substantially high levels of current between the wires when surges exceed said first voltage level,
- second means connectable between said wires at a location between said first means and the destination end of the communication line for clamping surges to a second predetermined voltage level lower than said first voltage level and for conducting current between the wires when surges exceed said second voltage level,
- inductance means connectable in series with said second means, and
- capacitance means connectable in line in said signal wire an in series between said first means and the series connection of said second means and inductance means.

13. A circuit as in claim 12 wherein said first means comprises a gas tube.

14. A circuit as in claim 12 wherein said second means is an avalanche diode.

15. A circuit as in claim 12 wherein said inductance means comprises one or more ferrite bead inductors.

16. A circuit as in claim 12 wherein said capacitance means comprises a metal oxide varistor.

17. A circuit as in claim 12 wherein said capacitance means comprises an avalanche diode.

* * * * *